Aug. 1, 1944. H. V. REED 2,354,829
FRICTION CLUTCH
Filed July 23, 1942  2 Sheets-Sheet 1

Inventor:
Harold V. Reed
By:
Edward C. Fitzbaugh
Atty.

Aug. 1, 1944.   H. V. REED   2,354,829
FRICTION CLUTCH
Filed July 23, 1942   2 Sheets-Sheet 2
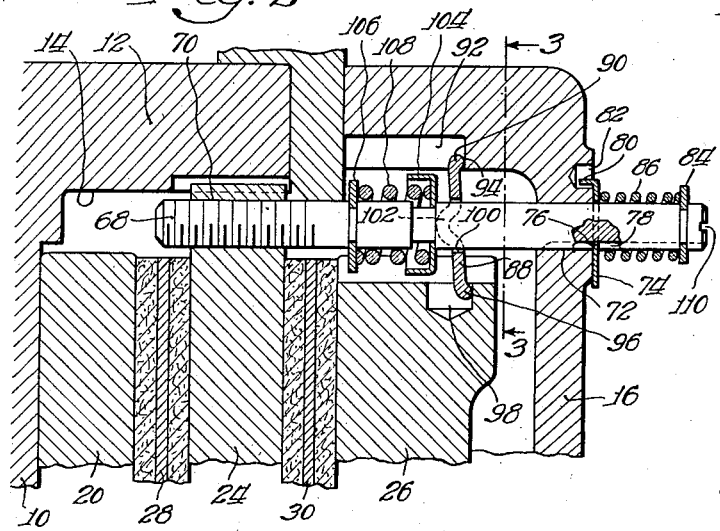
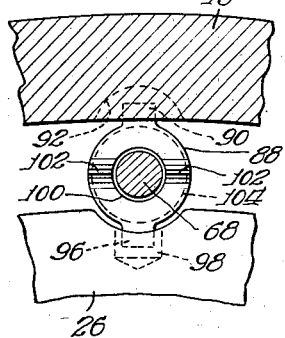
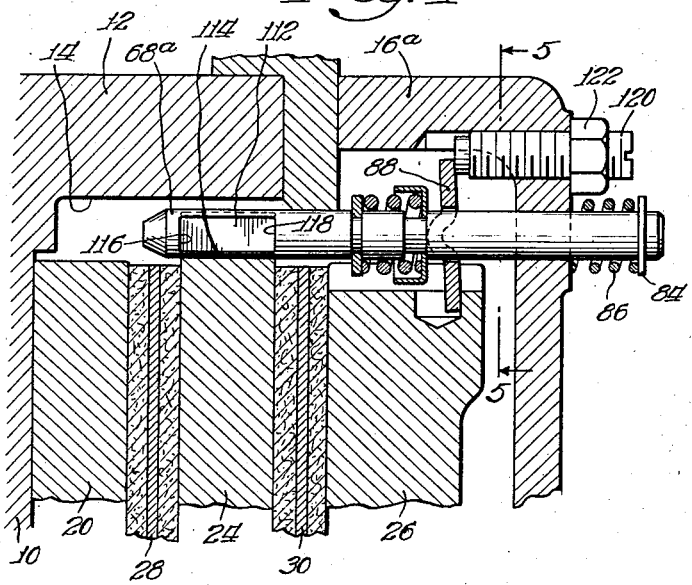
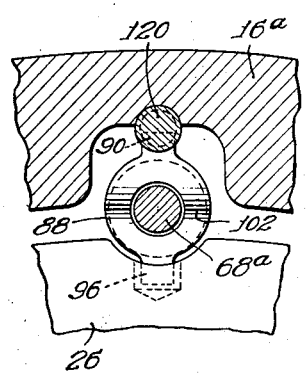
Inventor:
Harold V. Reed
By:
Edward C. Fritzhaugh
Atty.

Patented Aug. 1, 1944

2,354,829

UNITED STATES PATENT OFFICE 2,354,829

FRICTION CLUTCH

Harold V. Reed, Chicago, Ill., assignor to Borg-Warner Corporation, Chicago, Ill., a corporation of Illinois Application July 23, 1942, Serial No. 452,046

10 Claims. (Cl. 192—69)

This invention relates to multiple disc friction clutches and has as its general object to provide improved and simplified mechanism for maintaining an intermediate pressure plate in centered or substantially centered relation to a driving member and a rear pressure plate.

The invention relates particularly to friction clutches of the type embodying two driven discs and two pressure plates and aims to provide, in such a clutch, an intermediate pressure plate centering mechanism which is simple in construction but completely dependable in operation.

Another object is to provide a centering mechanism which is adapted to automatically compensate for any unequalized conditions that may arise in the clutch through, for example, unequal wear in the discs thereof.

Another object of the invention is to provide means for manually adjusting the centering mechanism so as to correct any unequalized condition that may arise in the clutch.

Other objects the advantages and uses of the invention will become more apparent after reading the following specification and claims, and after consideration of the drawings forming a part of the specification, wherein:

Fig. 2 is an axial sectional view of the same taken through the pressure plate positioning mechanism;

Fig. 3 is a transverse sectional view of a portion of the clutch shown in Fig. 1, taken as indicated by the line 3—3 of Fig. 2;

Fig. 4 is an axial sectional view of a portion of a clutch embodying a modified form of the invention; and Fig. 5 is a transverse sectional view of a portion of a clutch shown in Fig. 4 taken as indicated by the line 5—5 of Fig. 4.

Figure 1:
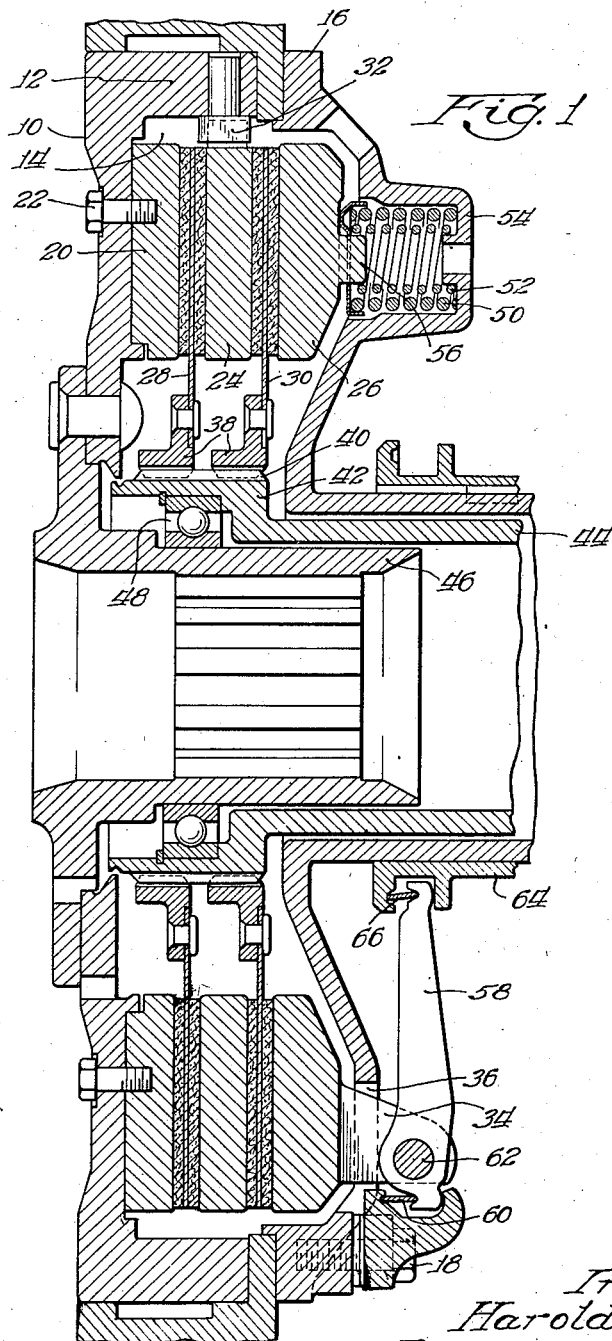
Fig. 1 is an axial section view of a clutch embodying the invention.

As an example of one form in which the invention may be embodied I have shown in Figs. 1 and 2 a clutch embodying a flywheel 10 having a rim 12 projecting axially to define an annular recess 14, a clutch cover 16 bolted as at 18 to the flywheel, a driving plate 20 fixed to the flywheel by means of cap screws 22 and disposed within the recess 14, an intermediate pressure plate 24, an outer pressure plate 26, and a pair of driven discs 28 and 30 respectively interposed between the driving plate 20 and the intermediate pressure plate 24 and between the intermediate pressure plate 24 and the outer pressure plate 26.

A driving link 32 connects the intermediate pressure plate 24 to the rim 12 to be driven thereby and a driving lug 34 on the rear pressure plate extends through an opening 36 in the cover 16 to form a driving connection between the cover and the rear pressure plate.

The driven discs 28 and 30 have hub members 38 which are splined at 40 on the enlarged hollow forward end 42 of the driven shaft 44. The hollow end 42 of the shaft 44 is piloted on the hub 46 of the flywheel 10 through the medium of a bearing 48.

The outer pressure plate 26 is urged in clutch packing direction by packing springs 50, 52 received in sockets 54 in the cover 16 and piloted on bosses 56 on the pressure plate 26.

The outer pressure plate 26 is retracted by a plurality of release levers 58 fulcrumed at 60 on the cover 16, pivoted at 62 to the lugs 34, and arranged to receive clutch releasing pressure from a release sleeve 64 through the medium of linkage 66.

It may now be noted that movement of the sleeve 64 toward the right, viewing Fig. 1, will result in the plate 26 being withdrawn toward the right against the action of the springs 50, 52. The plate 26 will in turn effect the withdrawal of the intermediate pressure plate 24. This is accomplished through the medium of the positioning mechanism, the primary purpose of which is to effect substantially equal separation of the intermediate pressure plate from the driving plate and of the outer pressure plate 26 from the intermediate pressure plate, in order that adequate separation may be effected with a minimum of total movement of the plates.

The positioning mechanism shown in Fig. 2 comprises a plurality of pull links each in the form of a rod 68 one end of which is threaded as at 70 into a peripheral portion of the intermediate pressure plate 24 and the other end of which is slidably extended through an opening 72 in the cover 16. A lock washer 74 has an inwardly extending lug 76 engaged in a longitudinal groove 78 in the link 68 and has a peripheral finger 80 bent in an axial direction and received in a recess 82 in the cover 16. Interposed between the washer 74 and a snap ring 84 secured to the outer end of the link 68 is a coil spring 86 which is adapted to urge the link 68 toward the right so as to tend to withdraw the intermediate pressure plate 24 from engagement with the driven disc 28.

Such withdrawing movement of the link 68 is overcome by the clutch engagement springs 50, 52 acting through the pressure plate 26 and a plurality of rock levers 88 each having an end portion 90 received in a recess 92 in the cover 16 and engaged against a shoulder 94 defining one end of said recess 92, and having an opposite end portion 96 received in a recess 98 in the periphery of the rear pressure plate 26 and engaged against the pressure plate in a manner to receive movement therefrom in the direction of clutch engagement.

The intermediate region of the rock lever 88 has an opening 100 through which the link 68 extends, and is formed with a pair of rounded humps 102 which are engaged against a cupped washer 104 through which the link 68 extends. Between the washer 104 and a snap ring 106 recessed into the link 68 is a coil spring 108, adapted to transmit to the snap ring 106 the movement received from the rock lever 88.

As the rear pressure plate 26 moves toward the left as viewed in Fig. 1, in clutch engaging direction, its movement is transmitted, at substantially one-half amplitude, from the rock lever 88 through the washer 104, spring 108, snap ring 106 and link 68 to the intermediate pressure plate 24, the link 68 moving against the opposition of the spring 86. As the driven discs 28 and 30 are clamped between the driving plate 20, intermediate pressure plate 24 and rear pressure plate 26, the spring 108 will, if necessary, yield in order to permit the pressure plates 24 and 26 to make full pressure engagement with the driven disc 30. The spring 108 would, in this event, transmit from the outer pressure plate 26 to the intermediate pressure plate 24 a portion of the pressure of the packing springs 50, 52 so as to effect the initial packing of the forward driven disc 28 between the plates 20 and 24, final and complete packing being effected by pressure transmitted directly from the pressure plate 26 through the driven disc 30 and pressure plate 24 to the disc 28. However, the engagement of the forward disc ahead of the rear disc is not a condition that the invention aims to achieve, but rather a condition which may arise as the result of faster wear of the rear disc than the forward disc or through some inequality in adjustment of the linkage, and the purpose of the spring 108 is to compensate for this condition.

The spring 108 is lighter than the springs 50, 52 so as to be dominated thereby. In turn, the spring 108 is heavier than the spring 86 so as to dominate the latter.

When the outer pressure plate 26 is retracted under the action of the levers 58, the spring 86 will come into play to retract the intermediate pressure plate 24 at a rate substantially half that of the rate of retraction of the plate 26, the former rate being controlled by the movement of the central region of the rock lever 88 at substantially half the rate of the movement of the outer end thereof which follows the plate 26, under the pull of the spring 86.

The position of the intermediate plate 24 between the plates 20 and 26 may be adjusted by rotating the link 68, a screw driver slot 110 being provided in the outer end of the link for that purpose.

In the form of the invention shown in Figs. 4 and 5, all parts are the same, and the same reference numerals have been used to designate the same, with the exception of the following:

The forward end of the link 68a has a reduced portion 112 which is received in a notch 114 in the periphery of the intermediate pressure plate 24, the shoulders 116 and 118 defining the extremities of the reduced portion 112 being engaged against the opposite faces of the plate 24 to transmit movement thereto from the link 68a.

Adjustment of the positioning mechanism is in this case accomplished by means of an adjusting screw 120 threaded into the cover 16a, one end thereof engaging the rock lever 88. A lock nut 122 is threaded onto the screw 120 for locking the same against undesired rotating movement.

I claim:

1. In a multiple disc clutch, an abutment member, a plurality of pressure plates axially movable relative to said abutment member, and means for transmitting axial movement of one of said plates in reduced amount to another of said plates, comprising a lever disposed intermediate said one plate and said abutment member and axially spaced from the plane of said other plate, said lever being fulcrumed with reference to said abutment member at one end and engaging said one plate at its other end, and a link in thrust receiving association with said lever, extending axially and connected to said other plates.

2. In a multiple disc clutch, a plurality of pressure plates, means embracing said pressure plates and providing an abutment disposed radially outwardly from the periphery of one of said plates, and means for transmitting axial movement of said one plate in reduced amount to another of said plates, comprising a lever fulcrumed with reference to said abutment member at one end, extending radially inwardly therefrom in substantially the plane of said one plate, and engaging said one plate at its other end, and a link in thrust receiving association with the intermediate portion of said lever, extending axially therefrom and connected to said other plate for transmitting movement from said lever to said other plate.

3. In a multiple disc clutch, an abutment member, a plurality of pressure plates axially movable relative to said abutment member, and means for transmitting axial movement of one of said plates in reduced amount to another of said plates, comprising a lever fulcrumed with reference to said abutment member at one end and engaging said one plate at its other end, a link for transmitting movement from the intermediate region of said lever to said other plate, and energy storing means acting between said link and said abutment member for moving said link in one direction in accordance with the movement of the central region of said lever, said lever functioning to transmit movement to said link in the opposite direction.

4. A clutch as defined in claim 3, wherein said link comprises a rod one end of which is extended through an opening in said abutment member, the intermediate region of which is extended through an opening in said lever and the other end of which is attached to said other plate, said energy storing means comprising a coil spring encircling said one end of the rod and interposed between said one end and the abutment member, and means for transmitting movement from said lever to said link in the other direction of its movement.

5. A clutch as defined in claim 3, wherein said link comprises a rod one end of which is extended through an opening in said abutment member, the intermediate region of which is extended through an opening in said lever, and the other end of which is attached to said outer plate, and wherein said energy storing means is interposed between one end of the link and said abutment member, and yielding means interposed between an abutment on the link and the intermediate region of said lever for yieldingly transmitting movement from said lever to the link in the other direction.

6. In a multiple disc clutch, an abutment member, a plurality of pressure plates axially movable relative to said abutment member, and means for transmitting axial movement of one of said plates in reduced amounts to another of said plates, comprising a lever fulcrumed with reference to said abutment member at one end, disposed closely adjacent the plane of said one plate and axially removed from the plane of another of said plates, and a link in thrust receiving association with the intermediate portion of said lever, extending axially therefrom and having an adjustable connection with said other plate.

7. A clutch as defined in claim 3, wherein said link is in a form of a rod one end of which is adjustably threaded into said other plate and the other end of which is extended through an opening in said abutment member, a lock washer keyed to said rod and adapted to engage said abutment member to normally restrain rotation of the rod and means for transmitting from said lever to said rod movement in said opposite direction, said energy storing means comprising a coil spring encircling the rod and engaged between said washer and said one end of the rod for moving said rod in said one direction.

8. In a multiple disc clutch, an abutment member, a plurality of pressure plates axially movable relative to said abutment member, and means for transmitting axial movement of one of said plates in reduced amount to another of said plates, comprising a lever disposed closely adjacent the plane of said one plate and removed from the plane of the other plate, said lever being fulcrumed at one end with reference to said abutment and engaging said one plate at its other end, and a rod in thrust receiving relation to the intermediate region of said lever, extending axially and threaded at one end into said other plate, the other end of said rod projecting exteriorly of the clutch and adapted to be engaged for rotating the rod to effect adjustment between said lever and said other plate.

9. In a multiple disc clutch, an abutment member, a plurality of pressure plates axially movable relative to said abutment member, and means for transmitting axial movement of one of said plates in reduced amounts to another of said plates, comprising a lever fulcrumed with reference to said abutment member at one end and engaging said one plate at its other end, and a rod in thrust receiving association with the intermediate portion of said lever, said rod extending axially and having one end provided with a threaded connection with said other plate and its other end projecting exteriorly of the clutch and adapted to be engaged for rotating the rod to effect adjustment between said lever and said other plate.

10. In a multiple disc clutch, an abutment member, a plurality of pressure plates axially movable relative to said abutment member, and means for transmitting axial movement of one of said plates in reduced amount to another of said plates, comprising a lever fulcrumed with reference to said abutment member at one end and engaging said one plate at its other end, and means for transmitting movement from the intermediate portion of said lever to said other plate comprising an axially extending rod connected at one end to said other plate and yielding means interposed between an abutment on said rod and said intermediate lever portion for yieldingly transmitting movement from said lever to said rod.

HAROLD V. REED.